United States Patent [19]

Dunn

[11] Patent Number: 5,090,857
[45] Date of Patent: Feb. 25, 1992

[54] METALLIC THREADED COMPOSITE FASTENER

[75] Inventor: Thomas J. Dunn, Pasadena, Tex.

[73] Assignee: The United States of America as represented by the Administrator of the National Aeronautics and Space Administration, Washington, D.C.

[21] Appl. No.: 648,772

[22] Filed: Jan. 31, 1991

[51] Int. Cl.$^5$ .................. F16B 19/00; F16B 35/02
[52] U.S. Cl. .................... 411/385; 411/65; 411/354; 411/901; 411/908
[58] Field of Search ................. 411/64–66, 411/266, 271, 325, 366, 354, 385, 384, 383, 900, 901, 904, 908

[56] References Cited

U.S. PATENT DOCUMENTS

| | | | |
|---|---|---|---|
| 2,388,273 | 11/1945 | Lord | 411/266 |
| 3,074,746 | 1/1963 | Shames et al. | 411/65 |
| 3,159,075 | 12/1964 | Bjork . | |
| 4,126,338 | 11/1978 | Coel et al. | 285/330 |
| 4,486,134 | 12/1984 | White | 411/103 |
| 4,687,395 | 8/1987 | Berecz et al. | 411/901 |
| 4,687,397 | 8/1987 | Berecz | 411/901 |
| 4,718,801 | 1/1988 | Berecz | 411/378 |
| 4,861,211 | 8/1989 | Dunsmore | 411/501 |
| 4,863,330 | 9/1989 | Olez et al. | 411/424 |
| 4,975,014 | 12/1990 | Rufin et al. | 411/385 |
| 5,007,781 | 4/1991 | Jensen et al. | 411/904 |

Primary Examiner—Neill R. Wilson
Attorney, Agent, or Firm—Russell E. Schlorff; John R. Manning; Edward K. Fein

[57] ABSTRACT

A metallic threaded composite fastener, particularly suited for high temperature applications, has a body member made of high temperature-resistant composite material with a ceramic coating. The body member has a head portion configured to be installed in a countersunk hole and a shank portion which is non-circular and tapered. One part of the shank may be non-circular and the other part tapered, or the two types of surfaces could be combined into a frustum of a non-circular cone. A split collar member made of high strength, high temperature-tolerant metal alloy is split into two halves and the interior of the halves are configured to engage the shank. The exterior of the collar has external threads and the upper portion of the collar has a circumferential groove which receives a lock ring to secure the collar halves to the shank. In the assembled condition torque may be transmitted from the body to the split collar by the engaged non-circular portions to install and remove the fastener assembly into or from a threaded aperture and shear loads in the collar threads are transferred to the shank tapered portion as a combination of radial compression and axial tension loads. Thus, tension loads may be applied to the fastener shank without damaging the ceramic coating.

24 Claims, 1 Drawing Sheet

METALLIC THREADED COMPOSITE FASTENER

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates generally to composite threaded fasteners, and more particularly to a high temperature-resistive metallic threaded composite fastener having a ceramic coated body with a non-circular shank and an externally threaded split collar of metal alloy which is secured to the shank of the body by a lock ring.

2. Brief Description of the Prior Art

Current state of the art hypervelocity vehicle thermal protection systems embodied in the Space Shuttle employ the use of carbon composite panels for protection in the highest temperature regions and glass coated sintered ceramic fiber tiles bonded onto the substructure for protection in the lower temperature regions. The carbon composite panels typically incorporate ninety degree (90°) flanged edges which are oriented toward the substructure and which are attached to the substructure with metallic fittings and fasteners.

The above described current thermal protection system has several disadvantages. The glass coated sintered ceramic fiber tiles are weak, easily damaged, and difficult to install and remove. Access must be provided to the region of the mechanical attachment hardware under the surface of the carbon composite panels and tiles. Seals are required for the gaps between the panels and the tiles. Thus, the current Shuttle thermal protection system is labor intensive, and therefore expensive to fabricate, install, and maintain. Although oxidation-resistant coatings are used in high temperature application, they are very brittle, weak in tension and shear, and cannot be threaded.

It would therefore be desirable to provide a fastener which can tolerate very high temperatures and would allow the development of a simplified thermal protection system.

There are several patents which disclose various composite fasteners, attachable threaded collars, and two part threaded members.

Bjork, U.S. Pat. No. 3,159,075 discloses a two-part fastener secured by a snap ring, however, it uses rubber O-rings and its metallic parts are exposed to the surface on which it is mounted.

Coel et al, U.S. Pat. No. 4,126,338 discloses an externally threaded collar attachable to a primary member, but would not be suitable for use with high temperature composite materials because its axial constraint means uses small sharp edges which would overstress relatively weak and brittle composite materials.

White, U.S. Pat. No. 4,486,134 discloses a complicated wood screw having an externally threaded collar attached by means of a snap ring.

Berecz, U.S. Pat. No. 4,718,801 discloses a composite threaded fastener but would not be suitable for high temperature applications because the metallic portion lies too close to the surface on which it is mounted and the thermal expansion differences between the metallic and composite portions would overstress the parts.

Dunsmore, U.S. Pat. No. 4,861,211, discloses a composite threaded fastener but is only applicable to plastic materials which would be limited to 350° F.

Olez et al, U.S. Pat. No. 4,863,330 disclose a composite threaded fastener made entirely of low-temperature plastics.

The present invention is distinguished over the prior art in general, and these patents in particular by a metallic threaded composite fastener, particularly suited for high temperature applications, which has a body member made of high temperature-resistant composite material with a ceramic coating. The body member has a head portion configured to be installed in a countersunk hole and a shank portion which is non-circular and tapered. One part of the shank may be non-circular and the other part tapered, or the two types of surfaces could be combined into a frustum of a non-circular cone. A split collar member made of high strength, high temperature-tolerant metal alloy is split into two halves and the interior of the halves are configured to engage the shank. The exterior of the collar has external threads and the upper portion of the collar has a circumferential groove which receives a lock ring to secure the collar halves to the shank. In the assembled condition torque may be transmitted from the body to the split collar by the engaged non-circular portions to install and remove the fastener assembly into or from a threaded aperture and shear loads in the collar threads are transferred to the shank tapered portion as a combination of radial compression and axial tension loads. Thus, tension loads may be applied to the fastener shank without damaging the ceramic coating.

SUMMARY OF THE INVENTION

It is therefore an object of the present invention to provide a high temperature-resistive metallic threaded composite fastener having a ceramic coated body with a non-circular shank and an externally threaded split collar of metal alloy which is secured to the shank of the body by a lock ring.

It is another object of this invention to provide a high temperature-resistive metallic threaded composite fastener having a ceramic coated body with a non-circular shank connected to an externally threaded split collar of metal alloy by a non-circular tapered connecting surface between the collar and the shank of the fastener body such that torque can be transmitted from the fastener body to the threaded collar and the tapered surface allows the collar to apply a tensile load to the fastener shank without damaging the ceramic coating.

Another object of this invention is to provide a metallic threaded composite fastener having a ceramic coated body with a non-circular shank and an externally threaded split collar of metal alloy which is secured to the shank of the body by a lock ring which allows the collar to be fastened to the body beneath a thermal protective panel.

Another object of this invention is to provide a high temperature-resistive metallic threaded composite fastener particularly suited for use with vehicle thermal protection systems whereby thermal protection panels can be installed by inserting a single fastener from the outside which greatly simplifies the installation.

Another object of this invention is to provide a high temperature-resistive metallic threaded composite fastener which allows thermal protection panels to be prestressed when installed.

Another object of this invention is to provide a high temperature-resistive metallic threaded composite fastener having a ceramic coated body and an externally threaded split collar of metal alloy whereby the body of the fastener can be made of the same, or complementary, material as a thermal protective panel thus allowing the fastener to be exposed to the same temperature and oxidizing environment.

A further object of this invention is to provide a high temperature-resistive metallic threaded composite fastener particularly suited for use with vehicle thermal protection systems whereby thermal protection panels can be installed by using a single fastener which allows thermal expansion in the plane of the panel.

A still further object of this invention is to provide a high temperature-resistive metallic threaded composite fastener which is simple in design and construction, and rugged and durable in use.

Other objects of the invention will become apparent from time to time throughout the specification and claims as hereinafter related.

The above noted objects and other objects of the invention are accomplished by a metallic threaded composite fastener, particularly suited for high temperature applications, which has a body member made of high temperature-resistant composite material with a ceramic coating. The body member has a head portion configured to be installed in a countersunk hole and a shank portion which is non-circular and tapered. One part of the shank may be non-circular and the other part tapered, or the two types of surfaces could be combined into a frustum of a non-circular cone. A split collar member made of high strength, high temperature-tolerant metal alloy is split into two halves and the interior of the halves are configured to engage the shank. The exterior of the collar has external threads and the upper portion of the collar has a circumferential groove which receives a lock ring to secure the collar halves to the shank. In the assembled condition torque may be transmitted from the body to the split collar by the engaged non-circular portions to install and remove the fastener assembly into or from a threaded aperture and shear loads in the collar threads are transferred to the shank tapered portion as a combination of radial compression and axial tension loads. Thus, tension loads may be applied to the fastener shank without damaging the ceramic coating.

DESCRIPTION OF THE PREFERRED EMBODIMENT

Figure 1:
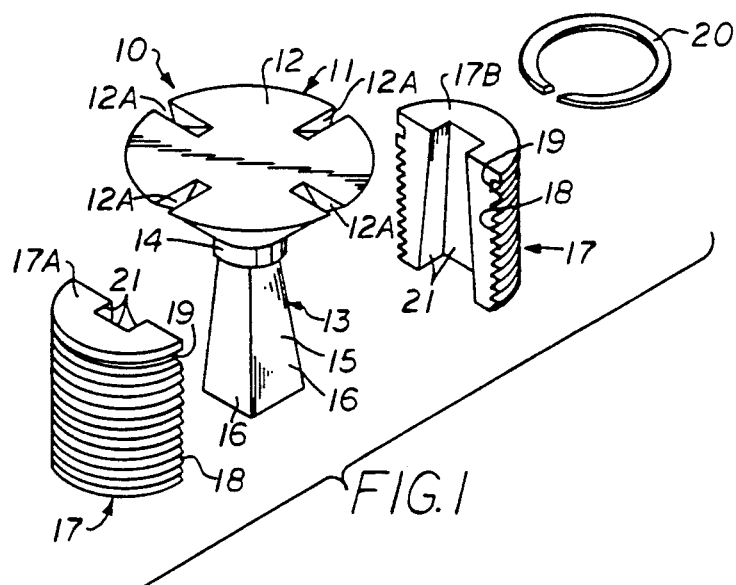
FIG. 1 is an exploded isometric view of a metallic threaded composite fastener in accordance with the present invention.
Figure 2:
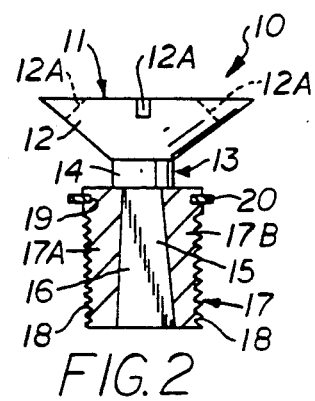
FIG. 2 is a longitudinal cross section of the metallic threaded composite fastener of FIG. 1 in the assembled condition.

Referring to the drawings by numerals of reference, there is shown in FIGS. 1 and 2, a preferred metallic threaded composite fastener 10. The fastener 10 has a body member 11 made of a high temperature-resistant composite material which is protected from oxidation by a ceramic coating. The body member 11 has a head portion 12 and a shank portion 13. The head 12 of the fastener body 11 preferably has the shape of an inverted conical frustum so that when the head is installed in a countersunk hole in a panel, the top of the head will be flush with the panel surface. The head 12 has recesses 12A to accept a tool for turning the assembled fastener into a threaded receptacle which is secured to the substructure.

The shank portion 13 has a circular portion 14 just below the head portion 12 and a tapered lower portion 15 below the circular portion. The tapered lower portion 15 has four flat sides 16 which taper angularly downward and outward from the circular portion 14.

It should be understood that the lower portion 15 of the shank portion 13 is a faying surface between the collar (described below) and the body 11 and must be both non-circular and tapered. One part of the surface could be non-circular and the other part tapered, or the two types of surfaces could be combined into a frustum of a non-circular cone.

A split collar member 17 made of high strength, high temperature-tolerant metal alloy is split into two halves 17A and 17B so that it can be fitted to the shank of the body. The exterior of the collar 17 has external threads 18. The upper portion of the collar 17 is provided with a circumferential groove 19 which receives a lock ring or snap ring 20. The interior of the collar 17 has four flat sides 21 which taper angularly downward and outward from the top end of the collar.

As seen in FIG. 2, the two halves 17A and 17B of the split collar 17 are assembled laterally onto the tapered portion 15 of the fastener body 11 and the lock ring or snap ring 20 is installed in the groove 19 to secure the collar 17 onto the body 11. In the assembled condition, the tapered surfaces 21 of the collar 17 are engaged on the tapered surfaces 16 of the body 11.

Figure 3:
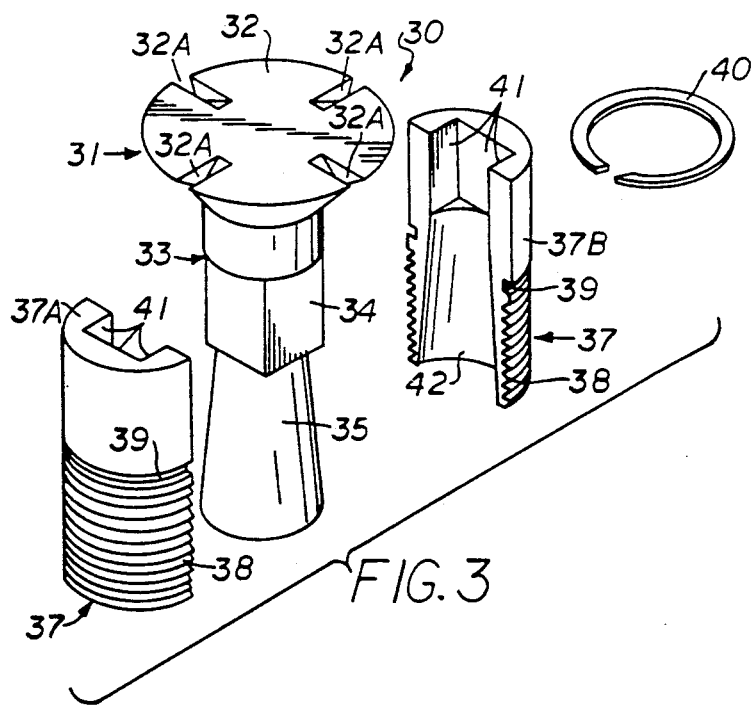
FIG. 3 is an exploded isometric view of an alternate metallic threaded composite fastener in accordance with the present invention.
Figure 4:
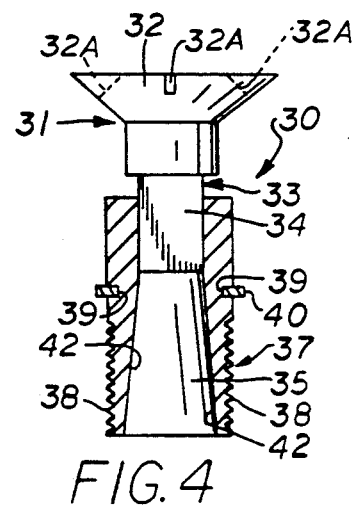
FIG. 4 is a longitudinal cross section of the metallic threaded composite fastener of FIG. 3 in the assembled condition.

Alternatively, there is shown in FIGS. 3 and 4, another preferred metallic threaded composite fastener 30 which has a body member 31 made of a high temperature-resistant composite material having a ceramic coating. The body member 31 has a head portion 32 and a shank portion 33. The head 32 of the fastener body 31 preferably has the shape of an inverted conical frustum so that when the head is installed in a countersunk hole in a panel, the top of the head will be flush with the panel surface. The head 32 has recesses 32A to accept a tool for turning the assembled fastener into a threaded receptacle which is secured to the substructure.

The shank portion 33 has a square portion 34 just below the head portion 32 and a conical tapered lower portion 35 below the square portion. The square portion 34 has four flat sides and the conical lower portion 35 extends downward and outward from the square portion 34. In this embodiment the faying, or connecting surfaces between the shank of the body 31 and split collar (described below) is both non-circular and tapered.

A split collar member 37 made of high strength, high temperature-tolerant metal alloy is split into two halves 37A and 37B so that it can be fitted to the shank of the body. The exterior of the collar 37 has external threads 38. The exterior of the collar 37 is provided with a circumferential groove 39 which receives a lock ring or snap ring 40. The interior of the collar 37 has four flat sides 41 at the upper end which correspond to the surfaces of the square portion 34 of the shank 33 and a conical tapered surface 42 therebelow which tapers angularly downward and outward from the flat surfaces 41 at the upper end of the collar.

As seen in FIG. 4, the two halves 37A and 37B of the split collar 37 are assembled laterally onto the shank portion 33 of the fastener body 31 and the lock ring or snap ring 40 is installed in the groove 39 to secure the collar 37 onto the body 31. In the assembled condition, the flat surfaces 41 and conical tapered surface 43 of the collar 37 are engaged on the square surface 34 and conical tapered surface 35 of the shank 33.

Since the faying, or contacting surfaces between the collars 17, 37 and the shanks 13, 33 of the bodies 11, 31 are non-circular and tapered, torque can be transmitted from the fastener body to the threaded collar and the tapered surface allows the collar to apply a tensile load to the fastener shank without damaging the brittle ceramic coating of the body. In other words, the shear loads in the collar threads are transferred to the shank as a combination of radial compression and axial tension loads. The fastener coating is strong in compression and thus can withstand these loads.

The present fastener is particularly suited for use in hypervelocity vehicle thermal protection systems embodied in the Space Shuttle. The Shuttle thermal protection system employs the use of carbon composite panels for protection in the highest temperature regions and glass coated sintered ceramic fiber tiles bonded onto the substructure for protection in the lower temperature regions. The carbon composite panels typically incorporate ninety-degree (90°) flanged edges which are oriented toward the substructure. The present fastener is suited for use in attaching the panels to the substructure.

In this particular application, the panels are subjected to very high surface temperatures up to 2800° F. The head of the fastener is also exposed to the same high temperatures as the panels. Temperatures in this range require very high temperature-resistant materials, such as coated carbon or carbon composites, which are relatively brittle and which cannot withstand highly concentrated point loads. Therefore, the present fastener is loaded in tension by the externally threaded metallic split collar, the halves of which have an interior surface which bears on the tapered shank of the fastener body. The collar halves are preferably made of heat-resistant metal alloys which can withstand temperatures as high as 1800° F. Since the split collar is mounted beneath the thermal panels, it is subjected to lower temperatures than are the head and shank of the fastener body.

In a preferred installation, a thermal panel is supported by blocks of rigid insulative material and the panel is fabricated with an exterior convex curvature so that when a single centrally located fastener is torqued down, the panel becomes prestressed as it is flattened. The present fastener would be inserted through a countersunk hole in a panel with the top of the head flush with the panel surface. The two halves of the split collar are assembled laterally onto the tapered portion, or square and tapered portion of the fastener body and the lock ring or snap ring is installed in the ring groove to secure the collar onto the body.

The substructure is provided with a threaded receptacle and the fastener assembly can be screwed into its receptacle from the exterior side of the panel by a tool inserted into the recesses in the fastener head. The non-circular interface between the fastener body and the collar allows torque in the fastener body to be transferred to the threaded collar. The mating tapered surfaces allow the collar to apply a tensile load to the fastener shank without damaging the brittle ceramic coating of the body. Since the split collar is mounted beneath the thermal panels, it is subjected to lower temperatures than are the head and shank of the fastener body.

Thus, the present fastener provides the basis for a much simpler, effective, and thermally efficient vehicle thermal protection system since the thermal protection panels can be installed by inserting a single fastener from the outside which greatly simplifies the installation. The fastener allows for prestressing the thermal protective panels. The use of a single fastener allows thermal expansion in the plane of the panel which has overlapping edges and therefore does not present gap problems. By providing a fastener body made of the same material as the panel, the fastener can be exposed to the high temperature oxidizing environment.

While this invention has been described fully and completely with special emphasis upon a preferred embodiment, it should be understood that within the scope of the appended claims the invention may be practiced otherwise than as specifically described herein.

I claim:

1. A metallic threaded composite fastener comprising:

a fastener body having a head portion configured to receive a tool for applying torque to the body and a non-circular and tapered shank portion therebelow, an externally threaded split collar member formed of metal alloy defining two halves and the interior of the collar having a non-circular and tapered portion corresponding to said shank non-circular and tapered portions to be received and engaged thereon, said collar exterior having a circumferential ring groove and releasable lock means on said collar formed of a lock ring removably received in said groove of the collar for releasably securing said collar halves onto said shank portion, whereby in the assembled condition torque may be transmitted from said body to said split collar by said engaged non-circular portions to install and remove said fastener assembly into or from a threaded aperture and shear loads in said collar threads are transferred to said shank tapered portion as a combination of radial compression and axial tension loads.

2. A metallic threaded composite fastener according to claim 1 in which
   said body has an oxidation resistant coating.

3. A metallic threaded composite fastener according to claim 2 in which;
   said oxidation resistant coating comprises a ceramic material.

4. A metallic threaded composite fastener according to claim 1 in which;
   said body is comprised of high temperature-resistant composite material and has an oxidation resistant coating.

5. A metallic threaded composite fastener according to claim 4 in which;
   said oxidation resistant coating comprises a ceramic material.

6. A metallic threaded composite fastener according to claim 1 in which;
said body is comprised of high temperature-resistant composite material and has an oxidation resistant coating, and
said collar is formed of high strength, high temperature-tolerant metal alloy.

7. A metallic threaded composite fastener according to claim 6 in which;
said oxidation resistant coating comprises a ceramic material.

8. A metallic threaded composite fastener according to claim 1 in which
said shank portion has a portion in the shape of a frustum of a circular cone extending downward and outward below said head portion.

9. A metallic threaded composite fastener according to claim 1 in which
said head portion has the shape of an inverted conical frustum to be received in a countersunk hole.

10. A metallic threaded composite fastener comprising;
a fastener body having a head portion configured to received a tool for applying torque to the body and a non-circular and tapered shank portion therebelow, said shank portion having a portion in the shape of a frustum of a non-circular cone extending downward and outward below said head portion,
an externally threaded split collar member formed of metal alloy defining two halves and the interior of the collar having a non-circular and tapered portion corresponding to said shank non-circular and tapered portions to be received and engaged thereon, and said split collar member interior having a portion in the shape of a non-circular cone corresponding to said shank non-circular cone portion,
releasable lock means on said collar for releasably securing said collar halves onto said shank portion, whereby
in the assembled condition torque may be transmitted from said body to said split collar by said engaged non-circular portions to install and remove said fastener assembly into or from a threaded aperture and shear loads in said collar threads are transferred to said shank tapered portion as a combination of radial compression and axial tension loads.

11. A metallic threaded composite fastener according to claim 10 in which
said shank portion has a circular portion just below said head portion and a non-circular tapered lower portion below the circular portion.

12. A metallic threaded composite fastener according to claim 11 in which
said non-circular tapered lower portion is polygonal.

13. A metallic threaded composite fastener according to claim 12 in which
said shank non-circular tapered lower portion has four flat sides which taper angularly downward and outward from said circular portion, and
said split collar member interior has four flat sides which taper angularly downward and outward from the top end of the collar.

14. A metallic threaded composite fastener according to claim 10 in which;
said collar is formed of high strength, high temperature-tolerant metal alloy.

15. A metallic threaded composite fastener comprising;
a fastener body having a head portion configured to receive a tool for applying torque to the body and a non-circular and tapered shank portion therebelow, said shank portion has a portion in the shape of a frustum of a circular cone extending downward and outward below said head portion, with said shank portion having a non-circular portion just below said head portion and a conical tapered lower portion below the non-circular portion,
an externally threaded split collar member formed of metal alloy defining two halves and the interior of the collar having a non-circular and tapered portion corresponding to said shank non-circular and tapered portions to be received and engaged thereon, said split collar member interior has a non-circular portion at its upper end and a conical tapered lower portion below the non-circular portion corresponding to the non-circular and conical tapered portion of said shank, and
releasable lock means on said collar for releasably securing said collar halves onto said shank portion, whereby
in the assembled condition torque may be transmitted from said body to said split collar by said engaged non-circular portions to install and remove said fastener assembly into or from a threaded aperture and shear loads in said collar threads are transferred to said shank tapered portion as a combination of radial compression and axial tension loads.

16. A metallic threaded composite fastener according to claim 15 in which
said shank and said collar non-circular portions are polygonal.

17. A metallic threaded composite fastener according to claim 16 in which
said non-circular portions have four flat sides.

18. A metallic threaded composite fastener comprising;
a fastener body having a head portion configured to receive a tool for applying torque to the body and a non-circular and tapered shank portion therebelow, said body being comprised of high temperature-resistant composite material and has an oxidation resistant coating, said shank portion has a portion in the shape of a frustum of a non-circular cone extending downward and outward below said head portion,
an externally threaded split collar member formed of high strength, high temperature-tolerant metal alloy defining two halves and the interior of the collar having a non-circular and tapered portion corresponding to said shank non-circular and tapered portions to be received and engaged thereon, said collar member interior having a portion in the shape of a non-circular cone corresponding to said shank non-circular cone portion, and
releasable lock means on said collar for releasably securing said collar halves onto said shank portion, whereby
in the assembled condition torque may be transmitted from said body to said split collar by said engaged non-circular portions to install and remove said fastener assembly into or from a threaded aperture and shear loads in said collar threads are transferred to said shank tapered portion as a combination of radial compression and axial tension loads.

19. A metallic threaded composite fastener according to claim 18 in which
said shank portion has a circular portion just below said head portion and a non-circular tapered lower portion below the circular portion.

20. A metallic threaded composite fastener according to claim 19 in which
said non-circular tapered lower portion is polygonal.

21. A metallic threaded composite fastener according to claim 20 in which
said shank non-circular tapered lower portion has four flat sides which taper angularly downward and outward from said circular portion, and
said split collar member interior has four flat sides which taper angularly downward and outward from the top end of the collar.

22. A metallic threaded composite fastener according to claim 18 in which
said shank portion has a portion in the shape of a frustum of a circular cone extending downward and outward below said head portion.

23. A metallic threaded composite fastener according to claim 22 in which
said shank portion has a non-circular portion just below said head portion and a conical tapered lower portion below the non-circular portion, and
said split collar member interior has a non-circular portion at its upper end and a conical tapered lower portion below the non-circular portion corresponding to the non-circular and conical tapered portion of said shank.

24. A metallic threaded composite fastener according to claim 23 in which
said shank and said collar non-circular portions are polygonal.

* * * * *